(12) United States Patent
Cavallaro Corti et al.

(10) Patent No.: US 11,930,033 B2
(45) Date of Patent: Mar. 12, 2024

(54) METHOD FOR VERIFYING VULNERABILITIES OF NETWORK DEVICES USING CVE ENTRIES

(71) Applicant: Nozomi Networks Sagl, Mendrisio (CH)

(72) Inventors: Alessandro Cavallaro Corti, Varese (IT); Moreno Carullo, Gavirate (IT); Andrea Carcano, San Francisco, CA (US)

(73) Assignee: Nozomi Networks Sagl, Mendrisio (CH)

( * ) Notice: Subject to any disclaimer, the term of this patent is extended or adjusted under 35 U.S.C. 154(b) by 317 days.

(21) Appl. No.: 17/140,906

(22) Filed: Jan. 4, 2021

(65) Prior Publication Data

US 2022/0217173 A1 Jul. 7, 2022

(51) Int. Cl.
| | | |
|---|---|---|
| *H04L 9/40* | (2022.01) | |
| *G06F 16/22* | (2019.01) | |
| *G06F 16/903* | (2019.01) | |
| *G06F 40/205* | (2020.01) | |
| *G06F 40/284* | (2020.01) | |

(52) U.S. Cl.
CPC ...... *H04L 63/1433* (2013.01); *G06F 16/2246* (2019.01); *G06F 16/90344* (2019.01); *G06F 40/205* (2020.01); *G06F 40/284* (2020.01)

(58) Field of Classification Search
None
See application file for complete search history.

(56) References Cited

U.S. PATENT DOCUMENTS

| 7,496,662 B1 * | 2/2009 | Roesch | H04L 63/1433 |
| | | | 709/224 |
| 9,753,928 B1 * | 9/2017 | Elmore | G06F 40/284 |
| 10,263,863 B2 * | 4/2019 | Mukerji | H04L 41/0893 |
| 2009/0083266 A1 * | 3/2009 | Poola | G06F 16/951 |
| | | | 707/999.102 |

(Continued)

OTHER PUBLICATIONS

Sanguino, "Software Vulnerability Analysis Using CPE and CVE", dated May 15, 2017, pp. 1-29, downloaded from the Internet on Jan. 24, 2023 using URL https://arxiv.org/pdf/1705.05347.pdf (Year: 2017).*

(Continued)

*Primary Examiner* — Eleni A Shiferaw
*Assistant Examiner* — Vy H Ho
(74) *Attorney, Agent, or Firm* — Jason Lee DeFrancesco

(57) ABSTRACT

The present invention relates to a method for verifying vulnerabilities of network device using Common Vulnerabilities and Exposures ("CVE)" entries comprising generating a CVE tree from each of the CVE entry and defining an indexed CVE entry, that identifies vulnerable configuration fields and extracts a set of vulnerable conditions comprising an operator attribute and nested CPE records. The CVE tree is provided with the operator attribute as node and with Common Platform Enumeration ("CPE") records as leaves from the node, wherein the decoding comprises tokenizing of the decoded string in a sequence of plurality of n-grams having predefined sizes, and wherein the matching comprises a lookup of the sequence of plurality of n-grams into the CVE tree, that raises an alert when the operator attribute corresponds a match between CPE records.

12 Claims, 5 Drawing Sheets

(56) References Cited

U.S. PATENT DOCUMENTS

2015/0317069 A1* 11/2015 Clements ............. G06F 3/0237
                                                                 715/773
2016/0188885 A1*  6/2016 Lee ...................... G06F 21/577
                                                                  726/25

OTHER PUBLICATIONS

Wikipedia, "XML", dated Jan. 1, 2020, pp. 1-17, downloaded from the Internet on Jan. 24, 2023 using URL: https://en.wikipedia.org/w/index.php?title=XML&oldid=933502188 (Year: 2020).*

David Waltermire, Paul Cichonski, and Karen Scarfone (NPL X: "Common Platform Enumeration: Applicability Language Specification Version 2.3", dated Aug. 2011, pp. 1-23, downloaded from the Internet on Jan. 24, 2023 using URL: https://nvlpubs.nist.gov/nistpubs/Legacy/IR/nistir7698.pdf (Year: 2011).*

Ahmed Alamir, "Needle in a Haystack: A Nifty Large-scale Text Search Algorithm Tutorial", dated 2015, pp. 1-20, downloaded from the Internet on Jan. 28, 2023 using URL: https://www.toptal.com/algorithms/ needle-in-a-haystack-a-nifty-large-scale-text-search-algorithm (Year: 2015).*

Elasticsearch, "NGram Tokenizer", dated Oct. 27, 2019, pp. 1-3, downloaded from the Internet on Jan. 24, 2023, URL: http://web.archive.org/web/20191027110654/https://www.elastic.co/guide/en/elasticsearch/reference/current/analysis-ngram-tokenizer.html (Year: 2019).*

Carla Marceau, Characterizing the Behavior of a Program Using Multiple-Length N-grams, dated 2005, pp. 1-3, downloaded from the Internet on Jan. 28, 2023, URL: https://apps.dtic.mil/sti/pdfs/ADA436198.pdf (Year: 2005).*

* cited by examiner

```
▼ EtherNet/IP (Industrial Protocol) Session: 0x00000000, List Identity
  ▶ Encapsulation Header
  ▼ Command Specific Data
    ▼ Item Count: 1
      ▼ Type ID: List Identity Response (0x000c)
          Length: 53
          Encapsulation Version: 1
        ▶ Socket Address
          Vendor ID: Rockwell Automation/Allen-Bradley (0x0001)
          Device Type: Programmable Logic Controller (14)
          Product Code: 90
          Revision: 2.21
          Status: 0x0004
          Serial Number: 0x6▬▬▬▬▬
          Product Name Length: 19
          Product Name: 1766-L32BXB C/21.00
          State: 0x00
```

FIG. 6

METHOD FOR VERIFYING VULNERABILITIES OF NETWORK DEVICES USING CVE ENTRIES

FIELD OF INVENTION

The present invention relates to the field of security methods and security systems in the management of Common Vulnerabilities and Exposures (CVE). In particular, the present invention relates to a method for verifying vulnerabilities of network devices using CVE entries.

BACKGROUND ART

The use of web applications and web services has become an integral part of virtually every aspect in the business process cycle. Besides promoting products and services online, businesses are interacting with customers over the internet and employees are using a growing number of web-based tools for every-day tasks. Web applications have become the most common platform for new software solutions. However, these efficient and cost-effective tools introduce new risks and a need for better or different security measures to compensate for the open, rapid development style that makes the technology increasingly common.

Hardware devices that are used to connect computers and electronic devices in general to a network are called network devices. These devices transfer data in a fast, secure and correct way over same or different networks and identify themselves on the networks in different ways. For example, the networks devices could transfer simple banner strings in protocols like CDP and LLDP or transfer structured information through OT protocols like Ethernet/IP, CIP, MMS.

Anyway, cybercriminals often infect their victims by exploiting vulnerabilities in hardware and software products. A way to reduce risks in network-related activities involves the activity of monitoring for network devices which enables organizations to better detect and respond to security compromises.

Identifying the network devices involved in these communications is not an easy task given the amount and variety of information that have to be analyzed. Moreover, assessing the vulnerabilities that could affect such network devices is an even harder task. To avoid data breaches caused by software vulnerabilities, organizations deploy Vulnerability Management Systems (VMSs) inside their IT infrastructures. Among the main functionalities, a VMS scans for software and hardware products installed inside a company that has potential vulnerabilities. To perform this task, the system manages an inventory containing information of the installed products, and moreover, it correlates this information with vulnerability information obtained from private and public sources.

The most used sources of vulnerability information are the Common Vulnerabilities and Exposures (CVE) feeds, which contain identifiers for known vulnerabilities and information related to them. The Common Vulnerabilities and Exposures (CVE) is a dictionary of common names (i.e., CVE Identifiers) for publicly known information security vulnerabilities. CVE's common identifiers make it easier to share data across separate network security databases and tools, and provide a baseline for evaluating the coverage of an organization's security tools. If a report from one security tool incorporates CVE Identifiers, it is possible to quickly and accurately access fix information in one or more separate CVE-compatible databases to remediate the problem. The Common Vulnerabilities and Exposures (CVE) system provides a reference-method for publicly known information-security vulnerabilities and exposures which can be used to assess the aforementioned vulnerability of said network devices. To identify software and hardware products affected by a vulnerability, a CVE includes a list of vulnerable software and hardware, in which the description of a product follows the specifications of the Common Platform Enumeration (CPE) standard. CPE is a method that specifies a naming scheme for applications, hardware devices, and operating systems.

The Common Vulnerability and Exposures (CVE) database hosted at MITRE is one of the largest publicly available source of vulnerability information, with a list of information security vulnerabilities and exposures that aims to provide common names for publicly known problems. The goal of CVE hosted at MITRE is to make it easier to share data across separate vulnerability capabilities (tools, repositories, and services) with this common enumeration.

There is a push for organizations to assess vulnerabilities in a consistent, well-structured manner to help companies and IT professionals automate the processes used in detecting, preventing, and reporting security incidents. The use of standards like CVE and CPE helps companies and IT professionals to publish and exchange information efficiently and effectively. Additionally, the standards are employed by VMSs to assign structured identifiers to software products (inventory) and search for vulnerabilities related to them (vulnerability scanning). Across organizations, IT-security solutions vendors, and security experts, CVE has become the de facto standard of sharing information on known vulnerabilities and exposures.

The standardization is yet to come and, anyway, the complex syntax of the CVEs makes it difficult to provide a structured and consistent access to data vulnerability. In particular, generating CPE is difficult since, though it is a standard format, the standardization does not say anything about what information goes in the CPE, so different products very often follow different criteria, wherein the same product is identified by different CPE identifiers leading to confusion and inconsistencies. Moreover, the source information extracted from network protocols is wildly different from protocol to protocol, adding another pain point to the process of generating CPE identifiers.

The annotated version of the CVE database, known as National Vulnerability Database (NVD) which is hosted by National Institute of Standards and Technology (NIST), is created with the scope to define some standardization on the basis of information provided by MITRE and through the public CVE site. NIST adds other information such as structured product names and versions, and also maps the entries to CWE names. NVD feed is provided both in XML and JSON formats structured in year-by-year files, as a single whole-database file and as an incremental feed reflecting the current year's vulnerabilities.

It would therefore be desirable to assess vulnerabilities of network devices from CVEs. In particular, it would be desirable to provide a match between information extracted from network devices and CVE databases in a simple and reliable way.

BRIEF DESCRIPTION OF THE INVENTION

The object of the present invention is to provide a method to assess vulnerabilities from CVE entries capable of minimizing the aforementioned drawbacks. In particular, it would be desirable to have a method capable to manage CVE entries providing a match between information extracted from network devices and CVE databases.

According to the present invention is described, therefore, a method for verifying vulnerabilities of network devices using CVE entries.

The method for verifying vulnerabilities of network devices using CVE entries comprises:
  indexing, by a computerized data processing unit, each of the CVE entry, defining an indexed CVE entry;
  decoding, by the computerized data processing unit, a network packet on a computer network relating to the network device, defining a decoded string relating to the identity of the network device;
  matching, by the computerized data processing unit, the decoded string with the indexed CVE entry, raising an alert if a match is found;
  wherein the indexing comprises generating a CVE tree from each of the CVE entry, defining an indexed CVE entry,
  wherein the generating comprises identifying the vulnerable configuration fields and extracting, for each of the vulnerable configuration field, the set of vulnerable conditions comprising the operator attribute and the nested CPE records, wherein the CVE tree is provided with the operator attribute as node and with the CPE records as leaves from the node,
  wherein the decoding comprises tokenizing of the decoded string in a sequence of plurality of n-grams having predefined sizes, and
  wherein the matching comprises a lookup of the sequence of plurality of n-grams into the CVE tree, raising the alert if, when the operator attribute corresponds to OR, a match between at least one of the CPE records is found and raising the alert if, when the operator attribute corresponds to AND, a match between all of the CPE records is found.

The method according to the present invention therefore allows to index any CVE entry and to fast match a network packet relating to a network device with the indexed CVE entry.

In an embodiment, the generating comprises identifying the vulnerable configuration fields and further extracting, for each of the vulnerable configuration field, at least one main operator attribute and a plurality of nested sets of vulnerable conditions, and
  wherein the CVE tree is provided with a main operator attribute as node and with each of the sets of vulnerable conditions as leaves from the node.

Thus, defining CVE tree even with complex structure, provided with a plurality of branches.

In an embodiment, the generating further comprises splitting each of the CPE records by name attributes defining a split CPE record provided with the first of the name attributes as CPE parent node, and each of the subsequent of the name attributes respectively as CPE leaves from a preceding name attribute and as CPE node for a following name attribute, and
  wherein each of the CPE records in the CVE tree is replaced by the related split CPE record with the last of the name attributes as CPE leave from the operator attribute.

In this way, each attribute is isolated and a more complete CVE tree could be generated.

In an embodiment, the matching comprises a lookup of the sequence of plurality of n-grams into the CVE tree starting from the first of the name attributes, raising the alert if a match between all name attributes of at least one of the split CPE records is found when the operator attribute corresponds to OR and raising the alert if a match between all name attributes of all of the split CPE records is found when the operator attribute corresponds to AND.

Therefore, the method according to the present invention allows a fast match even when the CVE tree results of a great complexity.

In an embodiment, the matching comprises a lookup of the sequence of plurality of n-grams into the CVE tree starting from the first of the name attributes and retracing the CVE tree, and wherein an n-gram is skipped when a match with an n-gram is not found.

In this way, it is possible to test the n-gram until a correspondence between one of them and a name attribute in a branch of the CVE tree is found.

In an embodiment, the splitting is made for the node of the CVE tree with more of the leaves,
  wherein the matching comprises a lookup of the sequence of plurality of n-grams into the CVE tree starting from the first of the name attributes of the split node and retracing the CVE tree up to the parent node, and
  wherein the splitting and the matching are iterated for a subsequent of the node of the CVE tree with more leaves.

Thus, choosing to index the node with the greater number of leaves increases the performance of the method according to the present invention because accessing an indexed name attribute will result fast.

In an embodiment, the network packet is of a discovery protocol type used by the network device to advertise its identity.

In an embodiment, the network packet is a Cisco Discovery Protocol.

In an embodiment, the sizes of said n-grams are comprised between 1 and 5, preferably the sizes of said n-grams are comprised between 1 and 3.

By choosing these sizes, the applicant has found that the number of generated n-grams maintains under a controlled level, while not affecting the quality of the matching procedure.

In an embodiment, the vulnerable configuration field is identified by the vuln:vulnerable-configuration tag.

In an embodiment, the operator attribute is identified by the cpe-lang:logical-test operator tag.

In an embodiment, the CPE record is identified by the cpe-lang:fact-ref tag.

In an embodiment, the name attributes are identified in the cpe-lang:fact-ref tag separated by colons.

In an embodiment, before the tokenizing the decoded string is normalized by transforming each uppercase character into its lowercase variant and by replacing underscores, parenthesis and quotes characters with whitespaces.

In this way, the decoded strings can be normalized with respect to the application of the method according to the present invention.

In an embodiment, the matching comprises a lookup of the sequence of plurality of n-grams into the CVE tree starting from the smallest of the n-grams to the biggest of the n-grams, with a moving window to generate said n-grams having a size equal to 1.

The sequence from the smallest to the biggest n-gram allows to increases the performance of the method.

DESCRIPTION OF THE FIGURES

These and further features and advantages of the present invention will become apparent from the disclosure of the preferred embodiments, illustrated by way of a non-limiting example in the accompanying figures, wherein:

FIG. 6 shows an Ethernet/IP CIP packet containing asset information;

DETAILED DESCRIPTION OF THE INVENTION

Figure 1:
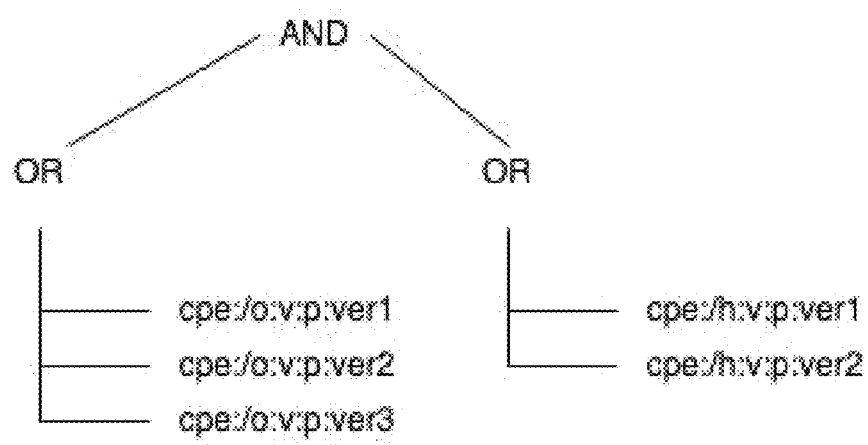
FIG. 1 shows a schematic view flowchart of the CVE tree of an exemplary CVE entry, according to the present invention.

The present invention relates to method for verifying vulnerabilities of network devices using CVE entries.

The method according to the present invention finds useful application in CVE based classification of vulnerable IoT systems. The invention is applied in scenarios where is required an automated approach to process a large amount of data coming from different sources without relying on the human interaction.

In particular, the present invention finds useful application in the field of security methods in the automatic management of large amounts of software and hardware vulnerability data and reports.

The term "CVE entry" means, in the present invention, a record commonly used in various databases or documents to refer to a given vulnerability, for example as issued by MITRE, the ID is in the form: CVE-yyyy-nnnnn.

The term "CVE tree" means, in the present invention, a representation in a tree graphic form of a CVE entry, provided with node and leaves.

The term "vulnerable configuration field" means, in the present invention, the field in a CVE entry which identifies software and hardware products affected by a vulnerability. This record contains the description of a product and follows the specifications of the Common Platform Enumeration (CPE) standard. The vulnerable configuration field is commonly identified with the vuln:vulnerable-configuration tag and with the vuln:vulnerable-softwarelist tag.

The term "CPE record" means, in the present invention, a record in a CVE entry in a vulnerable configuration field which defines a scheme for identifying: applications, hardware devices, and operating systems affected by a vulnerability.

The term "operator attribute" means, in the present invention, the logical, AND-OR, expression in a CPE record.

The term "name attribute" means, in the present invention, the attribute information of a CPE record relating to software and hardware products affected by a vulnerability.

The term "n-gram" means, in the present invention, a contiguous sequence of n items from a decoded string.

The term "decoded string" means, in the present invention, a string from a network packet relating to the identity of a network device.

The method for verifying vulnerabilities of network devices using CVE entries is capable to manage CVE entries and to provide a match between information extracted from network devices and CVE databases. In particular, the method according to the present invention has the objective of providing a fast and reliable way to match information extracted from a computer network and relating to a network device against a CVE database like the one freely available from the Nation Vulnerability Database (NVD).

The CVE entries can be imported, by computerized data processing unit of the known type, in bulk, with a plurality of CVE entries at time, or individually, with a single CVE entry at time. CVE entries, and further elaboration in the following as well, can be easily stored in a storage unit of the permanent type operatively connected to said data processing unit. A database associated with the IP/MAC address of the network devices can be created to provide the user with information about the vulnerabilities that are affecting the computer device in the observed computer network.

The method for verifying vulnerabilities of network devices using CVE entries, according to the present invention, comprises indexing each of the CVE entry, defining an indexed CVE entry. The indexing is preferably carried out by the computerized data processing unit, as previous described.

The indexing comprises generating a CVE tree from each of the CVE entry, defining an indexed CVE entry, as illustrated in the exemplary tree of FIG. 1. In particular, the generating of such CVE tree comprises identifying the vulnerable configuration fields and extracting, for each of the vulnerable configuration field, the set of vulnerable conditions comprising the operator attribute and the nested CPE records, wherein the CVE tree is provided with the operator attribute as node and with the CPE records as leaves from the node.

Where a CVE entry with a great complexity is ingested, the generating could comprise identifying the vulnerable configuration fields and further extracting, for each of the vulnerable configuration field, at least one main operator attribute and a plurality of nested sets of vulnerable conditions. Therefore, the CVE tree is provided with a main operator attribute as node and with each of the sets of vulnerable conditions as leaves from the node.

Thus, in this way it is possible to define a CVE tree even with complex structure, provided with a plurality of branches. In the exemplary CVE tree of FIG. 1 the generated CVE tree comprises two branches, a first branch provided with three CPE records and a second branch provided with two CPE records. Said two branches are joined with an AND operator attribute, while the CPE records in a branch are joined with an OR operator attribute.

After processing of the vuln:vulnerable-configuration in the described way the resulting data structure is a tree in which the leaves are CPE identifiers and the leaf nodes are logical operators, as already described for the exemplary CVE tree of FIG. 1.

According to the present embodiment, the vulnerable configuration field is identified by the vuln:vulnerable-configuration tag in the CVE entry. Therefore, as will be described in greater details later on, for every vuln:vulnerable-configuration tag of every CVE entry the logical condition described in the XML format is instantiated as a software data structure and an inverted index is built for a fast matching. The method to build the logical condition is recursive as the structure described in the CVE XML files can be recursive as well and can potentially represent logical conditions with an unlimited complexity and nesting.

Therefore, taking into account the aforementioned indexing, the method according to the present invention follows the below mentioned steps:
1. for each CVE entry, i.e. in a NVD CVE database or a different CVE input;
2. fetch the root <cpe-lang:logical-test> operator tag;
3. iterate all the children of the <cpe-lang:logical-test> operator tag and save the logical operator found on the operator attribute of the tag (AND, OR) as the nodes of the CVE tree;
4. save the name attribute of each <cpe-lang:fact-ref> tag as the leaves of said CVE tree;
5. repeat the method from step 3 for every <cpe-lang:logical-test> children tag found during the XML visit process.

Different tags can be used in different embodiment for the identification of the vulnerable configuration.

The method according to the present invention further comprises decoding a network packet on a computer network relating to the network device, in particular to the network device subject to check, defining a decoded string relating to the identity of said network device. The decoding is preferably carried out by the computerized data processing unit, the same as previous described.

Preferably, the network packet is of a discovery protocol type used by the network device to advertise its identity. More preferably, the network packet is a Cisco Discovery Protocol. In a further embodiment, different protocol can be used.

The decoding further comprises tokenizing of the decoded string in a sequence of plurality of n-grams having predefined sizes. The n-grams therefore define a contiguous sequence of items from the decoded string of the network packet. Preferably, the n-grams are defined of a size equal to "n" (preferably in range of values) and in a moving window with a size equal to "m", wherein a range of values for the size "n" is predefined and the value of "m" is predefined as well. The moving window allows to define a plurality of n-gram for each size of "n" by moving the items "m" at time. The plurality of n-grams may be stored in a n-grams vector for easy manage.

According to the present invention, the sizes of the n-grams are comprised between 1 and 3, a range of values which is considered consistent for the applicant. Further embodiments could use different sizes of n-grams, for example comprised between 1 and 5 but different value may be used.

By choosing the range between 1 and 5 and, in particular, 1 and 3, the applicant has found that the number of generated n-grams maintains under a controlled level, while not affecting the quality of the matching procedure.

Preferably, before the tokenizing the decoded string is normalized by transforming each uppercase character into its lowercase variant and by replacing underscores, parenthesis and quotes characters with whitespaces.

In this way, the decoded strings can be normalized with respect to the application of the method according to the present invention.

Finally, the method according to the present invention further comprises matching the decoded string with the indexed CVE entry, raising an alert if a match is found. Even the matching is preferably carried out by the computerized data processing unit, as previous described.

The matching comprises a lookup of the sequence of plurality of n-grams into the CVE tree, raising the alert if, when the operator attribute corresponds to OR, a match between at least one of the CPE records is found and raising the alert if, when the operator attribute corresponds to AND, a match between all of the CPE records is found.

In the present invention, the generating further comprises splitting each of the CPE records by name attributes defining a split CPE record provided with the first of the name attributes as CPE parent node, and each of the subsequent of the name attributes respectively as CPE leaves from a preceding name attribute and as CPE node for a following name attribute.

The logical condition is composed by some operators together with some CPE identifiers. In the present invention, the operator attribute is identified by the cpe-lang:logical-test operator tag. The cpe-lang:logical-test operator tag contains the logical condition that have to be evaluated to decide if the network device is matching or not.

CPE identifiers are composed by a sequence of attributes separated by a colon, every attribute has a specific meaning In this regard, the CPE record is identified by the cpe-lang:fact-ref tag. In particular, the name attributes are identified in the cpe-lang:fact-ref tag separated by colons. In the context of the present invention the CPE identifiers will be taken into account as they are critical to provide a match. The following name attributes are part of the CPE format: part, vendor, product, version, update, edition, language, software edition, target software, target hardware. Further name attributes can be identified and, as a consequence, more complex CPE identifiers can be defined. The complexity of the CPE identifiers does not affect the method according to the present invention because it is possible to handle each CPE identifier as a list of attributes separated by colon.

Therefore, taking into account the aforementioned splitting, the method according to the present invention follows the below mentioned steps:
1. the CVE tree representing the logical condition is visited to find the node with the greater number of leaves;
2. for each CPE identifier in the node found at step 1;
3. the CPE identifier is split to extract its name attributes, as detailed above;
4. each name attribute is added to the CVE tree if not already present;
5. the last attribute added to the CVE tree points to the parent operator attribute modified to remove the branch that contains the indexed CPE identifier indexed during this procedure.

Moreover, different tags can be used in different embodiment for the identification of the aforementioned operator attribute, CPE record and name attributes.

Each of the CPE records in the CVE tree is, thus, replaced by the related split CPE record with the last of the name attributes as CPE leave from the operator attribute.

Figure 2:
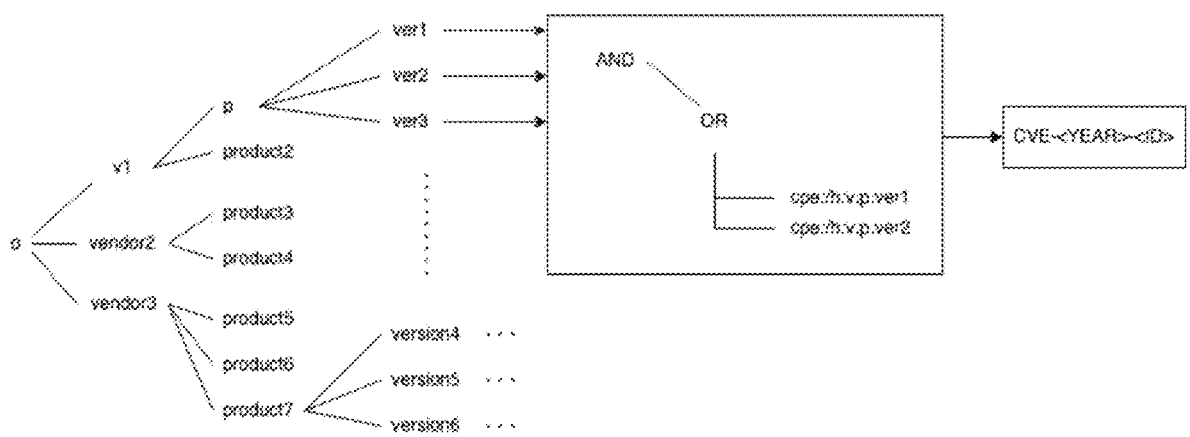
FIG. 2 shows a schematic view flowchart of CVE tree of FIG. 1, wherein splitting is applied to the node of the CVE tree with more of the leaves.

In this way, each attribute is isolated and a more complete CVE tree could be generated. The exemplary result is shown in FIG. 2. In particular, FIG. 2 shows the embodiment where the splitting is made for the node of the CVE tree with more of the leaves, which is represented by the branch having three leaves.

In the present invention, the matching further comprises a lookup of the sequence of plurality of n-grams, as generated, into the CVE tree starting from the first of the name attributes of the split node and retracing the CVE tree up to the parent node. In the case presented in FIG. 2, the matching will start from the name attribute "o", searching for one of the identified vendors, retracing the CVE tree up to the name attribute relating to the version.

Afterward, the splitting and the matching are iterated for a subsequent of the node of the CVE tree with more leaves. In the case presented in FIG. 2, only a single branch provided with two leaves is found therefore the splitting and the matching is further iterated a single time (not illustrated).

By choosing to index the node with the greater number of leaves the performance of the method according to the present invention is increased because accessing an indexed name attribute will result fast.

For a fast matching, the embodiment herewith described comprises a lookup of the sequence of plurality of n-grams into the CVE tree starting from the first of the name attributes, i.e. the name attribute "o", raising the alert if a match between all name attributes of at least one of the split CPE records is found when the operator attribute corresponds to OR, which condition is defined by the matching of one of the leaves in each branches of FIG. 1, and raising the alert if a match between all name attributes of all of the split CPE records is found when the operator attribute corresponds to AND, which condition is defined by the matching of the selected leave in the first branch and of the selected leave in the second branch in the same FIG. 1.

This allows a fast match even when the CVE tree results of a great complexity, i.e. provided with a great number of branches and/or with a great number of leaves.

In the present embodiment, the matching comprises a lookup of the sequence of plurality of n-grams into the CVE tree starting from the first of the name attributes and retracing the CVE tree, wherein an n-gram is skipped when a match with an n-gram is not found.

In this way, it is possible to test the n-gram until a correspondence between one of them and a name attribute in a branch of the CVE tree is found.

Therefore, taking into account the aforementioned matching, the method according to the present invention follows the below mentioned steps:
1. supported network packets, and related protocols, are analyzed;
2. information describing network devices, or its software, is extracted from the network packets as decoded string;
3. the decoded string is normalized and tokenized using the whitespace and some symbol characters as the split characters to ensure the output is consistent with the data added during the indexing;
4. the tokenization process outputs n-grams for n that goes from 1 to 3 with a moving window of size 1;
5. the result is a list of 1-grams, 2-grams and 3-grams in the same order of appearance of the original string;
6. for every n-gram in the list;
7. a lookup in the CVE tree is performed;
8. if the lookup is successful a sub-tree of the CVE tree is returned, the next n-gram is selected and the sub-tree of the CVE tree takes the place of the original CVE tree. The process is implemented recursively up to the parent node of the original CVE tree;
9. if the lookup is not successful the n-gram is skipped, the next one is selected and the procedure restart from step 8;
10. if the list of n-grams is empty and was not possible to navigate the CVE tree, or in a sub-tree of the CVE tree, until a leaf is found the procedure stops returning an empty result. In this case, a match is not found;
11. if a leaf is found the corresponding CVE id is returned. In this case, a match is found.

Preferably, the matching comprises a lookup of the sequence of plurality of n-grams into the CVE tree starting from the smallest of the n-grams to the biggest of the n-grams, with a moving window to generate said n-grams equal to 1.

The sequence from the smallest to the biggest n-gram allows to increases the performance of the method. In particular, the method leverages on the fact that very often the information is written in a hierarchical order in which the vendor is specified before the product and the product is specified before the version, therefore the moving window is selected with a size equal to 1. Based on that, the steps above allow a fast-matching procedure, despite the size and complexity of the CVE entry.

In the following, examples of CVE entries will be described with reference to the appended Figures and the application of the method according to the present invention. The examples have been described as simple as possible, but any kind of complexity could be treated by the method according to the present invention.

A first CVE entry relates to the ID CVE-2008-1151, herewith discussed as basic example wherein it comprises the following fields and tags:

```
<nvd>
    <entry id="CVE-2008-1151">
        <vuln:cve-id>CVE-2008-1151</vuln:cve-id>
        <vuln:vulnerable-configuration id="http://nvd.nist.gov/">
            <cpe-lang:logical-test negate="false" operator="OR">
                <cpe-lang:fact-ref name="cpe:/o:cisco:ios:12.0"/>
                <cpe-lang:fact-ref name="cpe:/o:cisco:ios:12.1"/>
            </cpe-lang:logical-test>
        </vuln:vulnerable-configuration>
    </entry>
</nvd>
```

Figure 3:
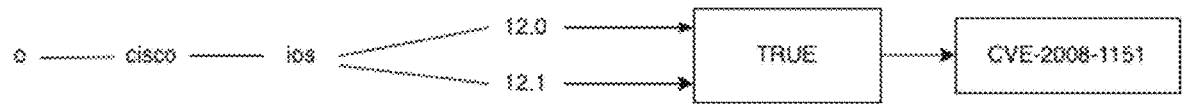
FIG. 3 shows a schematic view flowchart of the CVE tree of a first CVE entry, according to the present invention.
Figure 4:
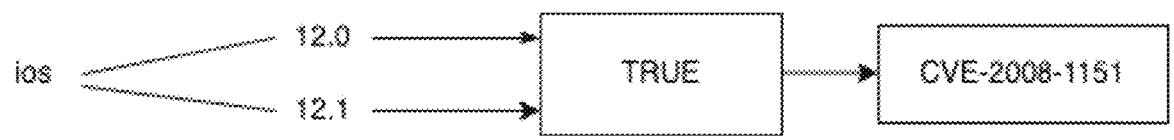
FIG. 4 shows a schematic view flowchart of CVE tree of FIG. 3, wherein a matching is partially applied.
Figure 5:
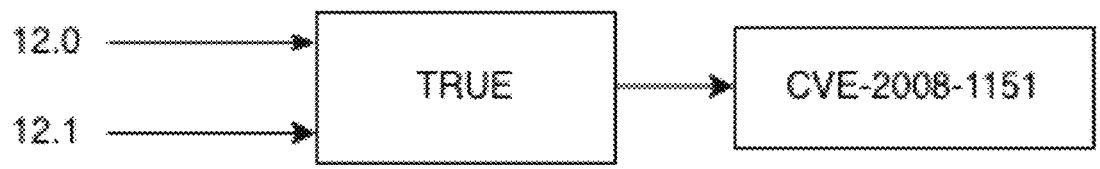
FIG. 5 shows a schematic view flowchart of CVE tree of FIG. 4, wherein a matching is partially applied.

After the indexing a CVE tree is defined as illustrated in FIGS. 3-5, where a schematic view flowchart of the CVE tree of said first CVE entry is shown. In particular, FIG. 3 illustrates a CVE tree provided with a single branch incorporating two leaves, after the further splitting has been done, without reporting the operator attribute OR which is considered anyway incorporated. The splitting, in particular, identified the name attributes "o", as part, "cisco" as vendor, "ios" as product, "12.0" and "12.1" as versions, wherein the last two attributes identify the two leaves of the CVE tree.

It is supposed that, a CDP network packet is decoded and the decode string "Cisco IOS Software, C2600 Software (AP3G2-K9W8-M), Version 12.0(6)E0A, RELEASE SOFTWARE (fc2)" from the Software Version field is extracted.

By tokenizing the decoded string the resulting n-grams, with "n" ranging from 1 to 3, are: "cisco", "cisco ios", "cisco ios software", "ios", "ios software", "ios software c2600", "software", "software c2600", "software c2600 software", "c2600", "c2600 software", "c2600 software ap3g2", "software", "software ap3g2", "software ap3g2 k9w8", "ap3g2", "ap3g2 k9w8", "ap3g2 k9w8 m", "k9w8", "k9w8 m", "k9w8 m version", "m", "m version", "m version 12.0", "version", "version 12.0", "version 12.0 6", "12.0", "12.0 6", "12.0 6 e0a", "6", "6 e0a", "6 e0a release", "e0a", "e0a release", "e0a release software", "release", "release software", "release software fc2", "software", "software fc2", "fc2". The n-grams are generated with a moving window having a size equal to 1, and the sorting of said n-grams has been done as they appear. Different size for the value "n" for the n-grams or "m" for the moving window may be applied, and different sorting as well.

The matching starts by selecting the first n-gram "cisco" and by performing a lookup on the CVE tree, starting from the first name attribute "cisco". Since the lookup is successful, the first node is disregarded and a sub-tree of the CVE tree is taken into consideration, as represented in FIG. 4.

The matching continues by selecting the subsequent n-grams, wherein the n-grams "cisco ios" and "cisco ios software" are discarded as they do not match with the name attribute "ios", while the subsequent n-gram "ios" generate a further match therefore, again, since the lookup is successful, the second leave is disregarded and a further sub-tree of the CVE tree is taken into consideration, as represented in FIG. 5.

The matching continues by selecting the subsequent n-grams, which are all discarded, as they do not match, until the n-gram "12.0" which terminates one of the branches. The operator attribute OR in this CVE entry allows to terminate the evaluation with a positive matching, therefore an alert is raised returning the ID CVE-2008-1151 as a result.

A second CVE entry relating to the ID CVE-2017-16740 is herewith discussed as a more complex example of CVE entry, wherein it comprises the following fields and tags (partially reported to avoid unnecessary complexity):

```
<entry id="CVE-2017-16740">
  <vuln:cve-id>CVE-2017-16740</vuln:cve-id>
  <vuln:vulnerable-configuration id="http://nvd.nist.gov/">
    <cpe-lang:logical-test operator="AND" negate="false">
      <cpe-lang:logical-test operator="OR" negate="false">
        <cpe-lang:fact-ref name="cpe:/o:rockwellautomation:1766-
            132bxb_firmware:21.000"/>
        <cpe-lang:fact-ref name="cpe:/o:rockwellautomation:1766-
            132bxb_firmware:21.001"/>
        <cpe-lang:fact-ref name="cpe:/o:rockwellautomation:1766-
            132bxb_firmware:21.002"/>
      </cpe-lang:logical-test>
      <cpe-lang:logical-test operator="OR" negate="false">
        <cpe-lang:fact-ref name="cpe:/h:rockwellautomation:1766-
            132bxb:-"/>
      </cpe-lang:logical-test>
    </cpe-lang:logical-test>
  </vuln:vulnerable-configuration>
  <vuln:vulnerable-configuration id="http://nvd.nist.gov/">
    <cpe-lang:logical-test operator="AND" negate="false">
      <cpe-lang:logical-test operator="OR" negate="false">
        <cpe-lang:fact-ref name="cpe:/o:rockwellautomation:1766-
            132bxba_firmware:21.000"/>
        <cpe-lang:fact-ref name="cpe:/o:rockwellautomation:1766-
            132bxba_firmware:21.001"/>
        <cpe-lang:fact-ref name="cpe:/o:rockwellautomation:1766-
            132bxba_firmware:21.002"/>
      </cpe-lang:logical-test>
      <cpe-lang:logical-test operator="OR" negate="false">
        <cpe-lang:fact-ref name="cpe:/h:rockwellautomation:1766-
            132bxba:-"/>
      </cpe-lang:logical-test>
    </cpe-lang:logical-test>
  </vuln:vulnerable-configuration>
  <vuln:vulnerable-configuration id="http://nvd.nist.gov/">
    <cpe-lang:logical-test operator="AND" negate="false">
      <cpe-lang:logical-test operator="OR" negate="false">
        <cpe-lang:fact-ref name="cpe:/o:rockwellautomation:1766-
            132awa_firmware:21.000"/>
        <cpe-lang:fact-ref name="cpe:/o:rockwellautomation:1766-
            132awa_firmware:21.001"/>
        <cpe-lang:fact-ref name="cpe:/o:rockwellautomation:1766-
            132awa_firmware:21.002"/>
      </cpe-lang:logical-test>
    </cpe-lang:logical-test>
  </vuln:vulnerable-configuration>
</entry>
```

Figure 7:
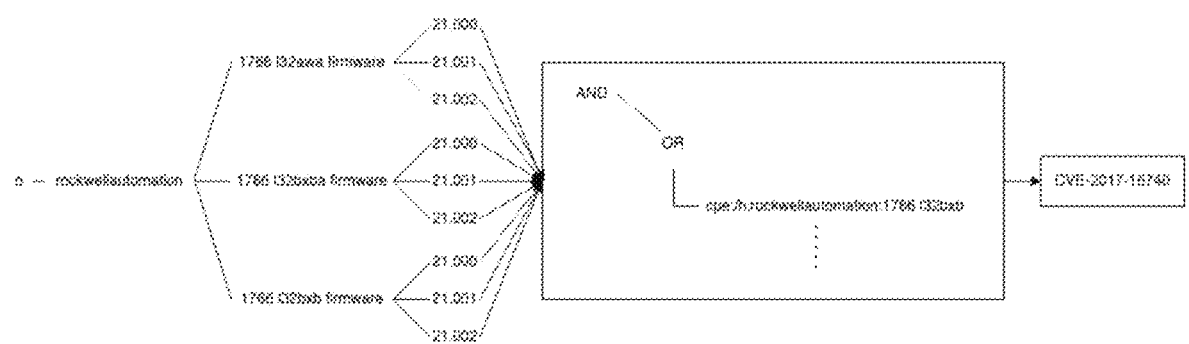
FIG. 7 shows a schematic view flowchart of the CVE graph of a second CVE entry including a CVE tree, according to the present invention.

After the indexing a CVE tree is defined as illustrated in FIGS. 7-10, where a schematic view flowchart of the CVE tree of said second CVE entry is shown. In particular, FIG. 7 illustrates a graphical representation of the CVE entry provided with two main branches incorporating a plurality of leaves, after the further splitting has been done, incorporating a main operator attribute AND as parent node and two operator attributes OR as leaves from said parent node and defining, in turn, the parent node for each of the two branches.

The splitting, in particular, identified the first branch as the one comprising the greater number of leaves, with the name attributes "o", as part, "rockwellautomation" as vendor, "1766-132awa_firmware" "1766-132bxba_firmware" "1766-132bxb_firmware" as products, "21.000" "21.001" and "21.002" as versions.

It is supposed that, an Ethernet/IP CIP packet, as illustrated in FIG. 6, is decoded. In this case, the computerized data processing unit extracts the vendor, the model and the firmware version. Two information items (o and h) are generated as the CIP packet contains information about both hardware (e.g. the Revision field) and software, wherein vendor is generated from the Vendor ID field as defined by the CIP standard and wherein product is extracted directly from Product Name, in addition some processing is applied to separate the model (1766-L32BXB C) from the firmware version (21.00). Some pieces of information are enriched with a custom logic specific to every protocol dissector to improve the recall, wherein, regarding the vendor, in addition to Rockwell Automation/Allen-Bradley the single RockwellAutomation string is inserted in the final result and wherein the firmware version is formatted to have 3 decimal places. Therefore, the string "o" is "Rockwell Automation/Allen-Bradley RockwellAutomation 1766-L32BXB series C firmware 1766-L32BXB firmware 21.000", while the string "h" is "Rockwell Automation/Allen-Bradley RockwellAutomation 1766-L32BXB series C 1766-L32BXB 2.21".

By tokenizing the decoded string the resulting n-grams, with "n" ranging from 1 to 3, are: "rockwell", "rockwell automation", "rockwell automation allen", "automation", "automation allen", "automation allen bradley", "allen", "allen bradley", "allen bradley rockwellautomation", "bradley", "bradley rockwellautomation", "bradley rockwellautomation 1766", "rockwellautomation", "rockwellautomation 1766", "rockwellautomation 1766 132bxb", "1766", "1766 132bxb", "1766 132bxb series", "132bxb", "132bxb series", "132bxb series c", "series", "series c", "series c firmware", "c", "c firmware", "c firmware 1766", "firmware", "firmware 1766", "firmware 1766 132bxb", "1766", "1766 132bxb", "1766 132bxb firmware", "132bxb", "132bxb firmware", "132bxb firmware 21.000", "firmware", "firmware 21.000", "21.000", for the string "o" and "rockwell", "rockwell automation", "rockwell automation allen", "automation", "automation allen", "automation allen bradley", "allen" "allen Bradley", "allen bradley rockwellautomation", "bradley", "bradley rockwellautomation", "bradley rockwellautomation 1766", "rockwellautomation", "rockwellautomation 1766", "rockwellautomation 1766 132bxb", "1766", "1766 132bxb", "1766 132bxb series", "132bxb", "132bxb series", "132bxb series c", "series", "series c", "series c 1766", "c", "c 1766", "c 1766 132bxb", "1766", "1766 132bxb", "1766 132bxb 2.21", "132bxb", "132bxb 2.21", "2.21" for the string "h". The n-grams are generated with a moving window having a size equal to 1, and the sorting of said n-grams has been done as they appear.

Different size for the value "n" for the n-grams or "m" for the moving window may be applied, and different sorting as well.

Figure 8:
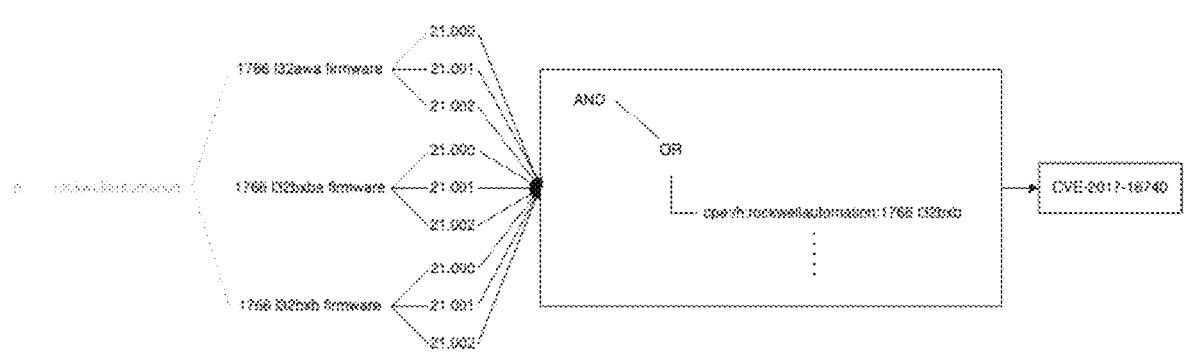
FIG. 8 shows a schematic view flowchart of CVE graph of FIG. 7, wherein a matching is partially applied.

The matching starts for the string "o" by selecting the first n-gram "rockwell" and by performing a lookup on the CVE tree relating to the software, discarding because it does not match. The lookup is successful with the n-gram "rockwellautomation", disregarding all the previous generated n-grams, therefore the first node is disregarded and a sub-tree of the CVE tree is taken into consideration, as represented in FIG. 8.

Figure 9:
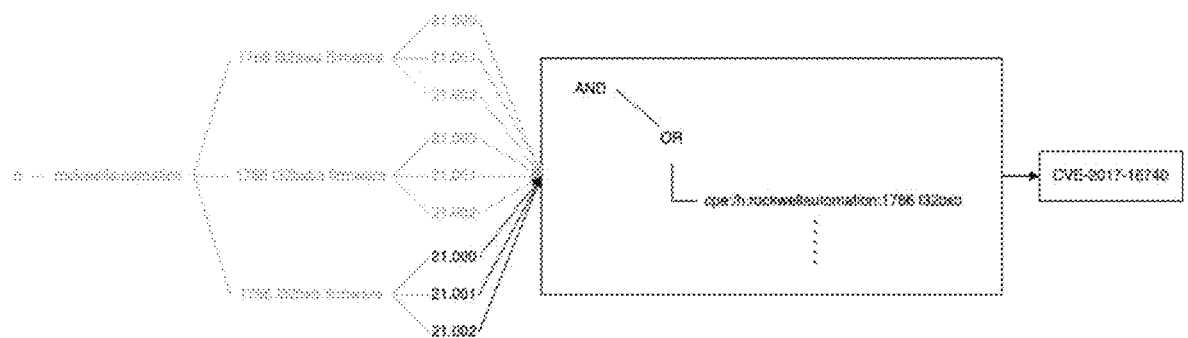
FIG. 9 shows a schematic view flowchart of CVE graph of FIG. 8, wherein a matching is partially applied.
Figure 10:
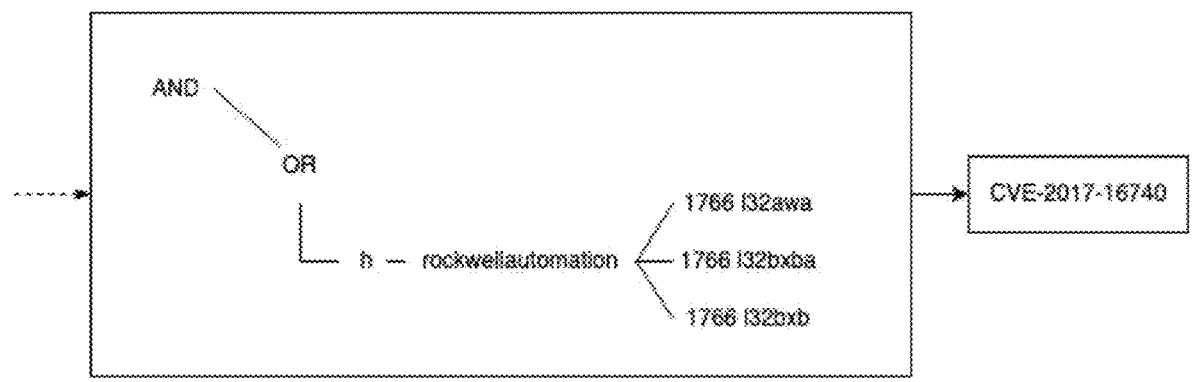
FIG. 10 shows a schematic view flowchart of CVE graph of FIG. 9, wherein a matching is partially applied.

The matching continues by selecting the subsequent n-grams, wherein the n-grams "1766132bxb firmware" is selected producing another match therefore, again, since the lookup is successful, the second leave is disregarded and a further sub-tree of the CVE tree is taken into consideration, as represented in FIG. 9.

The matching continues by selecting the subsequent n-grams, which are all discarded, as they do not match, until the n-gram "21.000" which terminates one of the branches. The operator attribute AND in this CVE entry does not allow to terminate the evaluation since a lookup in the branch relating to the string "h" have to be done. The leaves attached to the OR branch are indexed as well and the n-grams generated from the string "h" are used to find a matching path.

The first branch evaluated corresponds to the one with more leaves, which has been split. The second one, therefore, need to be split before the matching procedure. The leaves attached to the OR branch are indexed as well and the n-grams generated from the string "h" are used to find a matching path. The matching continues by selecting the first n-grams which matches in the lookup procedure for the string "h" which is "rockwellautomation". The procedure is repeated as already described for the previous branch, therefore it applies mutatis mutandis and will not described in greater details anymore. The last n-gram which matches corresponds to "1766132bxb" which terminates the second branch also.

Finally, both "o" and "h" CPE identifiers got a match and in view of the operator attribute AND in this CVE entry, a positive matching is determined, therefore an alert is raised returning the ID CVE-2017-16740 as a result The method according to the present invention therefore allows to index any CVE entry and to fast match a network packet relating to a network device with the indexed CVE entry.

The method according to the invention defines, therefore, an automatic way for recognition of vulnerable IoT devices and to test completes, sufficiency and reliability of CVE data in this respect.

Moreover, the method according to the present invention results scalable any number of CVE entries and any kind of complexity of said CVE entries as well.

The invention claimed is:

1. A method for verifying vulnerabilities of network device using Common Vulnerabilities and Exposures ("CVE") entries comprising:
   indexing, by a computerized data processing unit, each of said CVE entry, defining an indexed CVE entry;
   decoding, by said computerized data processing unit, a network packet on a computer network relating to said network device, defining a decoded string relating to the identity of said network device;
   matching, by said computerized data processing unit, said decoded string with said indexed CVE entry, raising an alert when a match is found;
   wherein said indexing comprises generating a CVE tree from each of said CVE entry, defining said indexed CVE entry,
   wherein said generating comprises identifying the vulnerable configuration fields and extracting, for each of said vulnerable configuration fields, a set of vulnerable conditions comprising an operator attribute and nested Common Platform Enumeration ("CPE") records, wherein said CVE tree is provided with said operator attribute as node and with said CPE records as leaves from said node,
   wherein said generating further comprises splitting each of said CPE records by name attributes defining a split CPE record provided with the first of said name attributes as CPE parent node, and each of the subsequent of said name attributes respectively as CPE leaves from a preceding of said name attribute and as CPE node for a following of said name attribute,
   wherein each of said CPE records in said CVE tree is replaced by said related split CPE record with the last of said name attributes as CPE leave from said operator attribute,
   wherein said splitting is made for said node of said CVE tree with more of said leaves,
   wherein said decoding comprises tokenizing of said decoded string in a sequence of plurality of n-grams having predefined sizes,
   wherein said matching comprises a lookup of said sequence of plurality of n-grams into said CVE tree, raising said alert when said operator attribute corresponds to OR operator and a match between at least one of said CPE records is found, and raising said alert when said operator attribute corresponds to AND operator and a match between all of said CPE records is found,
   wherein said matching comprises a lookup of said sequence of plurality of n-grams into said CVE tree starting from the smallest of said n-grams to the biggest of said n-grams, with a moving window to generate said n-grams,
   wherein said matching comprises a lookup of said sequence of plurality of n-grams into said CVE tree starting from said first of said name attributes of said split node and retracing said CVE tree up to the parent node, and said splitting and said matching are iterated for a subsequent of said node of said CVE tree with more of said leaves.

2. The method for verifying vulnerabilities of network devices using CVE entries according to claim 1, wherein said generating comprises identifying the vulnerable configuration fields and further extracting, for each of said vulnerable configuration field, at least one main operator attribute and a plurality of nested sets of vulnerable conditions, and
   wherein said CVE tree is provided with said main operator attribute as node and with each of said sets of vulnerable conditions as leaves from said node.

3. The method for verifying vulnerabilities of network devices using CVE entries according to claim 1, wherein said matching comprises a lookup of said sequence of plurality of n-grams into said CVE tree starting from said first of said name attributes, raising said alert when a match between all name attributes of at least one of said split CPE records is found and said operator attribute corresponds to OR, and raising said alert when a match between all name attributes of all of said split CPE records is found and said operator attribute corresponds to AND.

4. The method for verifying vulnerabilities of network devices using CVE entries according to claim 1, wherein said matching comprises a lookup of said sequence of plurality of n-grams into said CVE tree starting from said first of said name attributes and retracing said CVE tree, and wherein an n-gram is skipped when a match with an n-gram is not found.

5. The method for verifying vulnerabilities of network devices using CVE entries according to claim 1, wherein said network packet is of a discovery protocol type used by said network device to advertise its identity.

6. The method for verifying vulnerabilities of network devices using CVE according to claim 5, wherein said network packet is a Cisco Discovery Protocol.

7. The method for verifying vulnerabilities of network devices using CVE entries according to claim 1, wherein said sizes of said n-grams are comprised between 1 and 5.

8. The method for verifying vulnerabilities of network devices using CVE entries according to claim 1, wherein said vulnerable configuration field is identified by tag, vuln:vulnerable-configuration.

9. The method for verifying vulnerabilities of network devices using CVE entries according to claim 1, wherein said operator attribute is identified by a cpe-lang:logical-test operator tag.

10. The method for verifying vulnerabilities of network devices using CVE entries according to claim 1, wherein said CPE record is identified by a cpe-lang:fact-ref tag.

11. The method for verifying vulnerabilities of network devices using CVE entries according to claim 1, wherein said name attributes are identified by a cpe-lang:fact-ref tag separated by colons.

12. The method for verifying vulnerabilities of network devices using CVE entries according to claim 1, wherein before said tokenizing said decoded string is normalized by transforming each uppercase character in its lowercase variant and by replacing underscores, parenthesis and quotes characters with whitespaces.

* * * * *